United States Patent
Jung (10) Patent No.: US 9,847,683 B2
(45) Date of Patent: Dec. 19, 2017

(54) HAIRPIN CONNECTING DEVICE AND HAIRPIN WINDING MOTOR INCLUDING THE SAME

(71) Applicant: HYUNDAI MOBIS CO., LTD., Seoul (KR)

(72) Inventor: Dae Sung Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 414 days.

(21) Appl. No.: 13/713,358

(22) Filed: Dec. 13, 2012

(65) Prior Publication Data

US 2014/0077636 A1 Mar. 20, 2014

(30) Foreign Application Priority Data

Sep. 20, 2012 (KR) .......................... 10-2012-0104326

(51) Int. Cl.
| | |
|---|---|
| *H02K 3/28* | (2006.01) |
| *H02K 11/00* | (2016.01) |
| *H02K 15/00* | (2006.01) |
| *H02K 3/12* | (2006.01) |

(52) U.S. Cl.
CPC .......... *H02K 3/28* (2013.01); *H02K 11/0094* (2013.01); *H02K 15/0062* (2013.01); *H02K 3/12* (2013.01)

(58) Field of Classification Search
CPC ........ H02K 15/0081; H02K 3/12; H02K 3/28; H02K 13/08; H02K 3/505
USPC .................................................... 310/71, 260
See application file for complete search history.

(56) References Cited

U.S. PATENT DOCUMENTS

| | | | | | |
|---|---|---|---|---|---|
| 3,151,260 | A | * | 9/1964 | MacCracken, Jr. ...... | H02K 3/50 310/260 |
| 6,208,058 | B1 | * | 3/2001 | Taji .......................... | H02K 3/12 310/108 |
| 6,448,681 | B1 | * | 9/2002 | Matsunaga .............. | H02K 3/12 310/179 |
| 8,093,778 | B2 | * | 1/2012 | Schmid .................... | H02K 3/12 310/201 |
| 8,436,506 | B2 | * | 5/2013 | Wang ....................... | H02K 3/12 228/115 |
| 2001/0040415 | A1 | * | 11/2001 | Asao ........................ | H02K 3/38 310/201 |
| 2003/0214190 | A1 | * | 11/2003 | Congdon ................. | H02K 3/28 310/71 |

(Continued)

FOREIGN PATENT DOCUMENTS

| | | |
|---|---|---|
| JP | 2001-238386 A | 8/2001 |
| JP | 2010-239740 A | 10/2010 |
| KR | 10-0397041 A | 9/2003 |

OTHER PUBLICATIONS

Korean Office Action dated Aug. 22, 2013 in counterpart Korean Patent Application No. 10-2012-0104326. (4 pages in Korean).

*Primary Examiner* — Hanh Nguyen
*Assistant Examiner* — Leda Pham
(74) *Attorney, Agent, or Firm* — NSIP Law (57) ABSTRACT

Disclosed are a hairpin connecting device and a hairpin winding motor including the same. An exemplary embodiment of the present invention may provide a hairpin connecting device including: a cover part shaped like a circular loop fastened to a leg side of a stator core; and a plurality of connection caps arranged inside the cover part in a circumference direction and configured to electrically connect connected ends of respective hairpins exposed to the leg side.

7 Claims, 7 Drawing Sheets

(56) References Cited

U.S. PATENT DOCUMENTS

2009/0100665 A1* 4/2009 Berger ............... H02K 15/0081
29/596
2011/0215660 A1* 9/2011 Goto ........................ H02K 3/24
310/53

* cited by examiner

HAIRPIN CONNECTING DEVICE AND HAIRPIN WINDING MOTOR INCLUDING THE SAME

CROSS-REFERENCE TO RELATED APPLICATION

This application claims priority to and the benefit of Korean Patent Application No. 10-2012-0104326 filed in the Korean Intellectual Property Office on Sep. 20, 2012, the entire contents of which are incorporated herein by reference.

TECHNICAL FIELD

The present invention relates to a hairpin connecting device and a hairpin winding motor including the same, and more particularly, to a hairpin connecting device for conveniently connecting hairpins in a hairpin winding motor in which a plurality of hairpins is fastened and connected to slots of a stator core to form a coil winding portion of the stator, and a hairpin winding motor including the same.

BACKGROUND OF THE INVENTION

Recently, a method for improving output of a motor for improving performance of a hybrid vehicle has been actively researched and developed. It is generally known that the output of the motor is proportional to the number of turns of a coil wound around a stator core. Accordingly, in order to improve the output of the motor without increasing a size of the motor, a method of increasing a space factor of the coil wound around the stator core may be considered. As one of the aforementioned methods, a method of winding a polygonal coil having a shape of an approximate quadrangular cross section, instead of using an annular coil having a circle cross section, has been recently researched.

However, the polygonal coil has relative difficulty in an operation of coil winding compared to the annular coil. Accordingly, as a method of easily winding the polygonal coil, a motor (hereinafter, referred to as a "hairpin winding motor" for convenience of description) using a method of forming a coil winding portion by inserting a plurality of separated hairpins in a coil of a stator to be fastened to the coil of the stator, and then connecting the respective hairpins by welding has been suggested. The aforementioned hairpin winding motor forms coil winding of the stator core by fastening the hairpins shaped like an approximate U-shape to respective slots of the stator core and then connecting the hairpins arranged in respective layers of the respective slots by welding. Accordingly, the hairpin winding motor overcomes an apparatus limit according to a winding apparatus, and may easily perform a coil winding operation with the polygonal coil.

However, the hairpin winding motor accompanies a plurality of repeated welding operations differently from a winding method by a winding apparatus, so that the repeated welding operations primarily cause defective connection between the respective hairpins or degrade productivity.

SUMMARY OF THE INVENTION

The present invention has been made in an effort to provide a hairpin connection device for conveniently connecting hairpins and a hairpin winding motor including the same.

An exemplary embodiment of the present invention provides a hairpin connecting device including: a cover part shaped like a circular loop fastened to a leg side of a stator core; and a plurality of connection caps arranged inside the cover part in a circumference direction and configured to electrically connect connected ends of respective hairpins exposed to the leg side.

In this case, the cover part may be formed of an insulator.

Further, the respective connection caps may be formed of electrical conductors.

Further, the cover part may be formed so as to shield the hairpins exposed to the leg side from the outside.

Further, the respective connection caps may include: first connection caps arranged inside the cover part in a radius direction; and second connection caps arranged outside the cover part in a radius direction so as to be adjacent to the first connection cap.

In this case, the first connection cap may electrically connect a first connected end disposed at an internal circumferential side of the stator core and a second connected end disposed at an external circumference side of the first connected end, and the second connection cap may electrically connect a third connected end disposed at an external circumferential side of the second connected end and a fourth connected end disposed at an external circumference side of the third connected end.

Further, an insulation part may be included between the first and second connection caps.

In this case, the insulation part may be integrally formed with the cover part to include an insulation plate interposed between the first and second connection caps.

Another exemplary embodiment of the present invention provides a hairpin winding motor including the hairpin connecting device.

The hairpin connecting device and the hairpin winding motor including the same according to the exemplary embodiments of the present invention may electrically connect the connected ends of the respective hairpins even without the welding process. Accordingly, it is possible to prevent a problem, such as operation efficiency deterioration or productivity deterioration due to the repeated welding operations in the related art, and also solve a problem, such as product performance deterioration due to welding defect or failure.

DETAILED DESCRIPTION OF THE EMBODIMENTS

For convenience of description, a general configuration of a hairpin winding motor will be first described, and then a hairpin connecting device and the hairpin winding motor including the same according to the present invention will be described.

Figure 1:
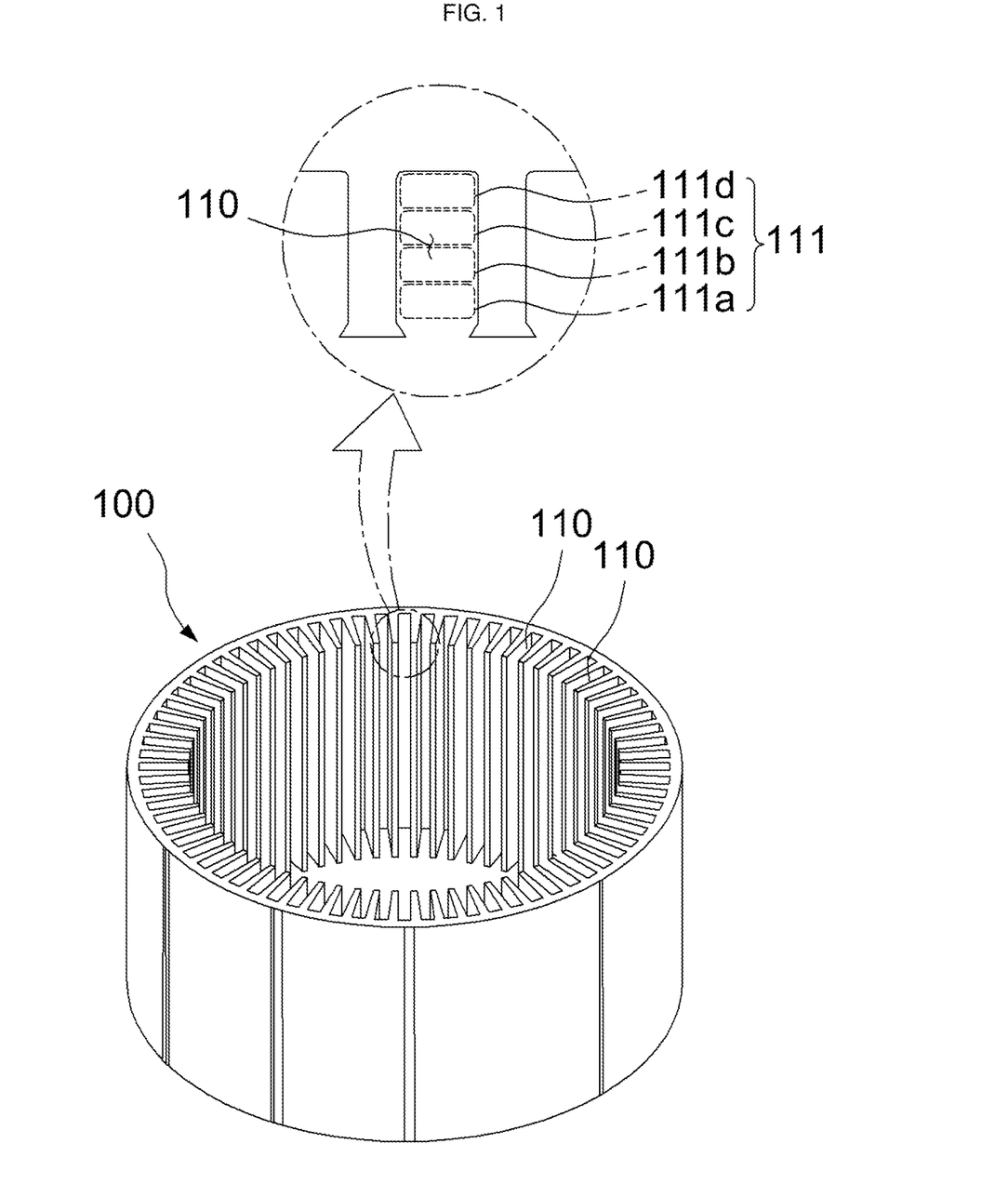
FIG. 1 is a perspective view illustrating a stator core of a hairpin winding motor.

FIG. 1 is a perspective view illustrating a stator core of the hairpin winding motor.

Referring to FIG. 1, a stator core 100 may be generally formed in a circular loop or ring shape. Although it is not illustrated, a rotor may be disposed inside the stator core 100, and the rotor may include a rotation shaft and be rotatably formed.

The stator core 100 may be provided with slots 110. The slots 110 may be formed toward an external circumferential side from an internal circumference of the stator core 100. Otherwise, the slots 110 may be formed so as to extend in a radius direction of the stator core 100 in a predetermined degree.

Referring to the expanded view of FIG. 1, the slot 110 may be formed in a multilayer structure. That is, a plurality of layers 111 may be formed in a radius direction of the stator core 100 in the slot 110. FIG. 1 exemplifies a case in which a total of four layers 111 are formed in one slot 110. However, the number of layers 111 formed in the slot 110 may be changed according to output of a motor, a winding design method, and the like. Hereinafter, a case in which the four layers 111 are formed in one slot 110 as illustrated in FIG. 1 will be mainly described, the respective layers 111 is denoted by first to four layers 111a, 111b, 111c, and 111d in an order of arrangement from the internal circumferential side of the stator core 100.

Further, the plurality of slots 110 is formed in the stator core 100. The plurality of slots 110 may be arranged in a radial shape in a circumferential direction of the stator core 100. The number of slots 110 formed in the stator core 100 may be changed according to the output of the motor, a winding design method, and the like. For example, the stator core 100 may be provided with 60 or 72 slots 110 as necessary.

FIGS. 2A and 2B are perspective views illustrating a hairpin of the hairpin winding motor.

It is noted that FIG. 2A illustrates a form before a hairpin 200 is inserted in and fastened to the stator core 100, and FIG. 2B illustrates a form after the hairpin 200 is inserted in and fastened to the stator core 100 to be bent.

Figure 2:
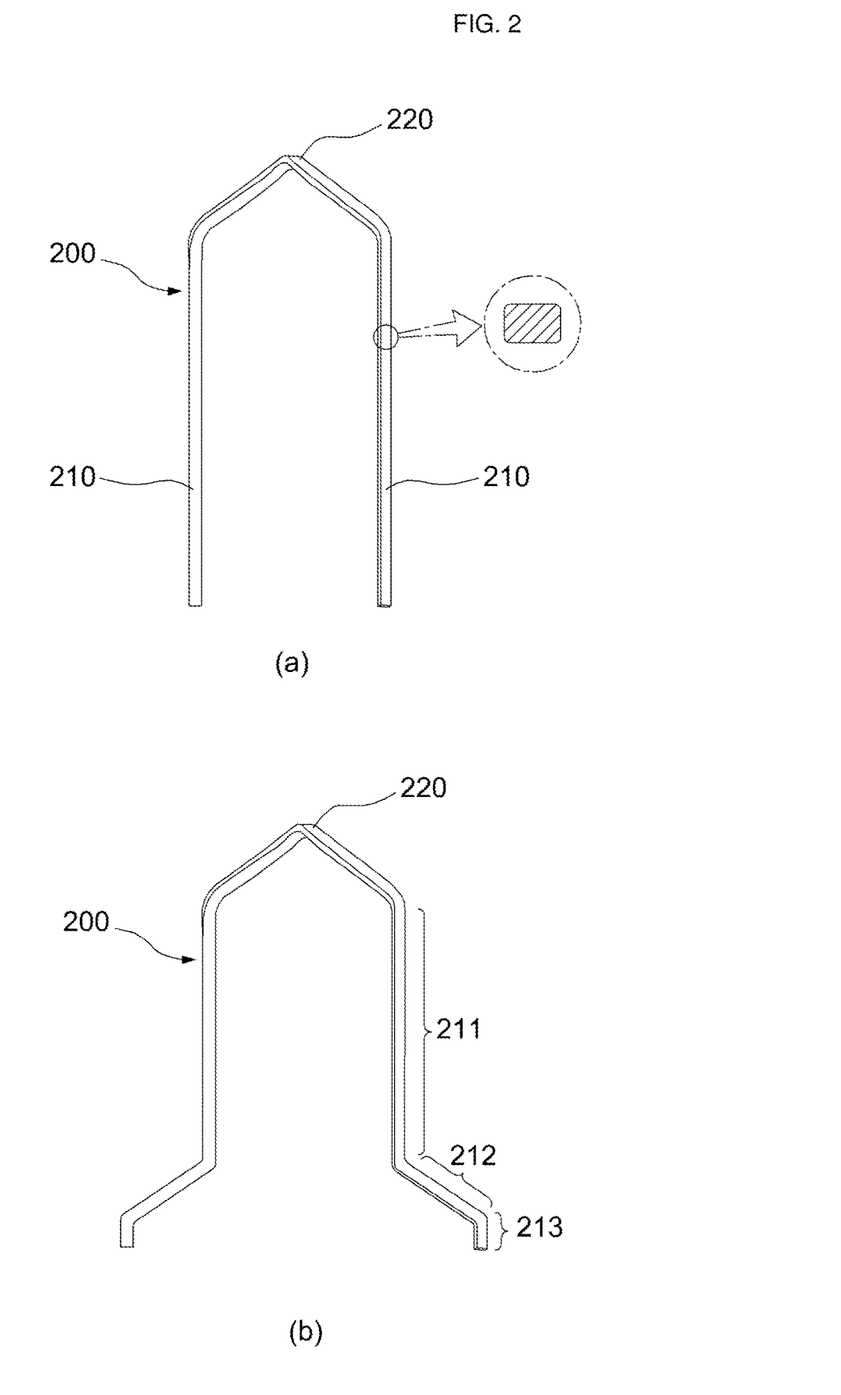
FIGS. 2A and 2B are perspective views illustrating a hairpin of a hairpin winding motor.

Referring to FIG. 2, the hairpin 200 may be generally formed in a U-shape or a V-shape. The plurality of hairpins 200 is connected to form a coil winding portion, and to this end, the hairpin 200 may be formed of an electrical conductor as is to be described below.

The hairpin 200 may include a pair of leg portions 210 and a head portion 220. As is to be described below, the pair of leg portions 210 is inserted in and fastened to the slots 110 of the stator core 100, respectively. Further, each leg portion 210 is accommodated in the slot 110 of the stator core 100 and a part of the leg portion 210 is exposed to the outside of the slot 110 of the stator core 100. Further, an end of each leg portion 210 is connected to a leg portion of another hairpin. For convenience of description, a portion of each leg portion 210 accommodated in the slot 110 of the stator core 100 is referred to as an accommodated portion 211, a portion of each leg portion 210 exposed to the outside of the slot 110 of the stator core 100 is referred to as an exposed portion 212, and a portion of each leg portion 210 connected with a leg portion of another hairpin is referred to as a connected end 213.

In the meantime, the hairpin 200 may be formed of a polygonal coil having an approximate quadrangular cross section. The polygonal coil may improve the output of the motor by increasing a space factor of the coil inside the slot 110.

Figure 3:
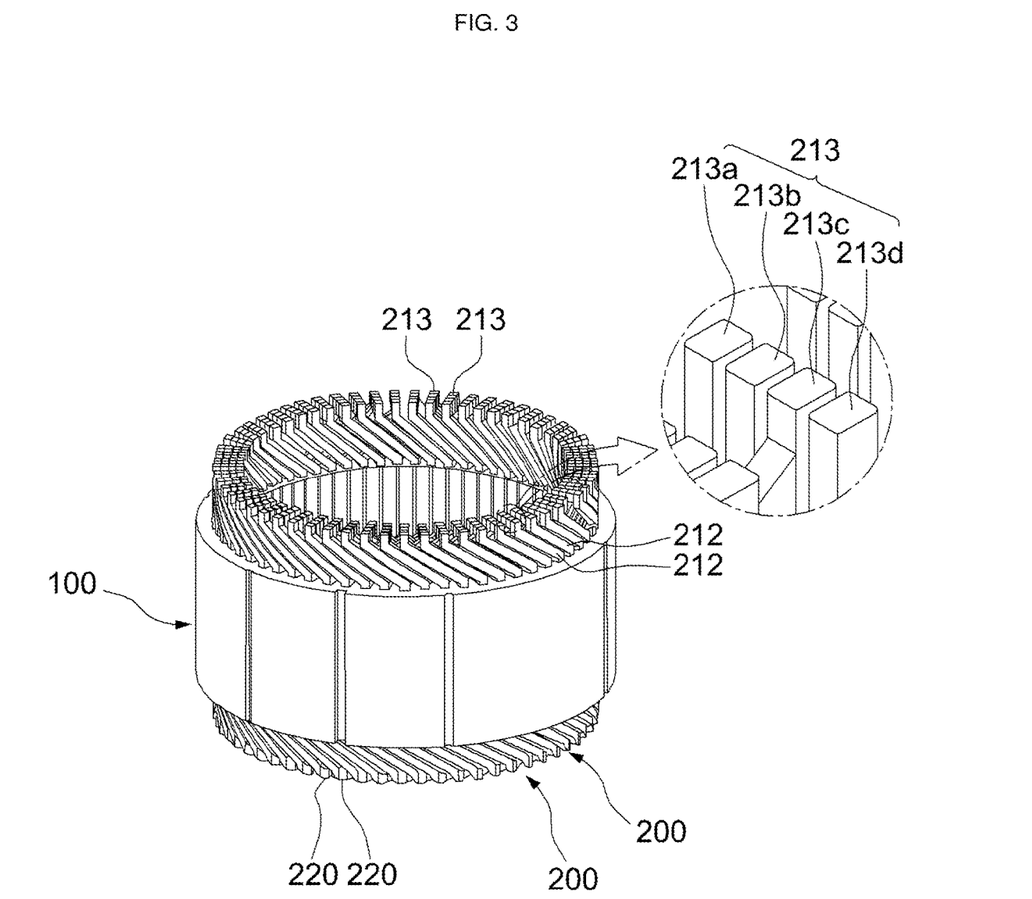
FIG. 3 is a perspective view illustrating a state in which hairpins are fastened to a stator core.

FIG. 3 is a perspective view illustrating a state in which the hairpins are fastened to the stator core.

Referring to FIG. 3, the hairpin winding motor forms coil winding by fastening the plurality of hairpins 200 described with reference to FIG. 2 to the stator core 100 described with reference to FIG. 1.

More particularly, both the leg portions 210 of the hairpin 20 may be inserted in and fastened to the slots 110 formed in the stator core 100, respectively. In this case, both the portions 210 of the hairpin 200 may be fastened so as to be spaced apart from each other by the predetermined number of slots. For example, when one leg portion 210 of the hairpin 200 is fastened to a first slot, the other leg portion 210 may be fastened to a seventh slot that is spaced apart from the first slot by six slots. However, the number of slots by which both the portions 210 of the hairpin 200 are spaced apart from each other may be variously changed according to a winding design method.

Further, each leg portion 210 of the hairpin 200 fills one layer 111 of each slot 110. That is, each leg portion 210 is inserted in and fastened to each layer 111 of each slot 110. To additionally describe with reference to the exemplary description of FIG. 1, the leg portion 210 of the hairpin 200 is inserted in and fastened to each of the first to fourth layers 111, and thus the four leg portions 210 may be arranged in one slot 110 in a radius direction.

The aforementioned fastening method of the hairpin 200 is publicly known in the art and is far from the technical gist of the present invention, so that a more detailed description will be omitted.

In the meantime, when the plurality of hairpins 200 is fastened to the respective slots 110 of the stator core 100 as described above, the exposed portions 212 of the respective hairpins 200 exposed to the outside of the slots 110 are bending or twisting processed, to consequentially have a form illustrated in FIG. 3. That is, the connected ends 213 of the hairpins 200 are continuously arranged at one side of the stator core 100 in a circular loop or ring shape, and the head portions 220 of the hairpins 200 are arranged at an opposite side of the stator core 100 in a circular loop or ring shape. For convenience of description, a side at which the connected end 213 of the hairpin 200 is arranged is referred to as a "leg side", and a side at which the head portion 220 of the hairpin 200 is arranged is referred to as a "head side".

A plurality of connected ends 213 of the hairpins 200 may be arranged at the leg side in the radius direction of the stator core 100 according to the number of layers 111 formed in the slot 110. That is, the leg portions 210 of the hairpins 200 are inserted in and fastened to each of the first to fourth layers 111 formed in the slot 110, so that every four connected ends 213 are arranged at the leg side in the radius direction. For convenience of description, the respective connected ends 213 are referred to as first to fourth connected ends 213a, 213b, 213c, and 213d in an order of arrangement at the inner circumferential side of the stator core 100.

In the case of the hairpin winding motor, the coil winding is formed by connecting the aforementioned connected ends 213. That is, the respective hairpins 200 are electrically connected by connecting the first and second connected ends 213a and 213b, and connecting the third and fourth connected ends 213c and 213d to form one coil winding. In general, the aforementioned connected ends 213 are connected with each other by welding. That is, an insulating paper is inserted between the first and second connected ends 213a and 213b and the third and fourth connected ends 213c and 213d, and the first and second connected ends 213a and 213b or the third and fourth connected ends 213c and 213d are connected by welding, so that the respective hairpins 200 are electrically connected.

However, as can be seen from FIG. 3, the plurality of connected ends 213 is very densely arranged at the leg side, and the great number of connected ends 213 is formed according to the number of slots 110 or the number of layers 111 inside each slot 110. Accordingly, the connection of the connected ends 213 through welding requires a highly precise operation, and has a problem in that a welding defect or failure is frequently generated. Further, even when a welding defect or failure is generated at a part, it is necessary to remove all of the hairpins 200, and fasten the hairpins 200 and perform a welding operation again, and thus the connection method by welding is very inefficient in terms of the operation. Further, since a plurality of welding operations is repeated (for example, a minimum number of 120 times of welding is required when the number of slots having four layers is 60), the connection method by welding has a problem of deterioration in productivity.

Hereinafter, a hairpin connecting device and a hairpin winding motor including the same according to an exemplary embodiment of the present invention will be described with reference to the drawings.

Figure 4:
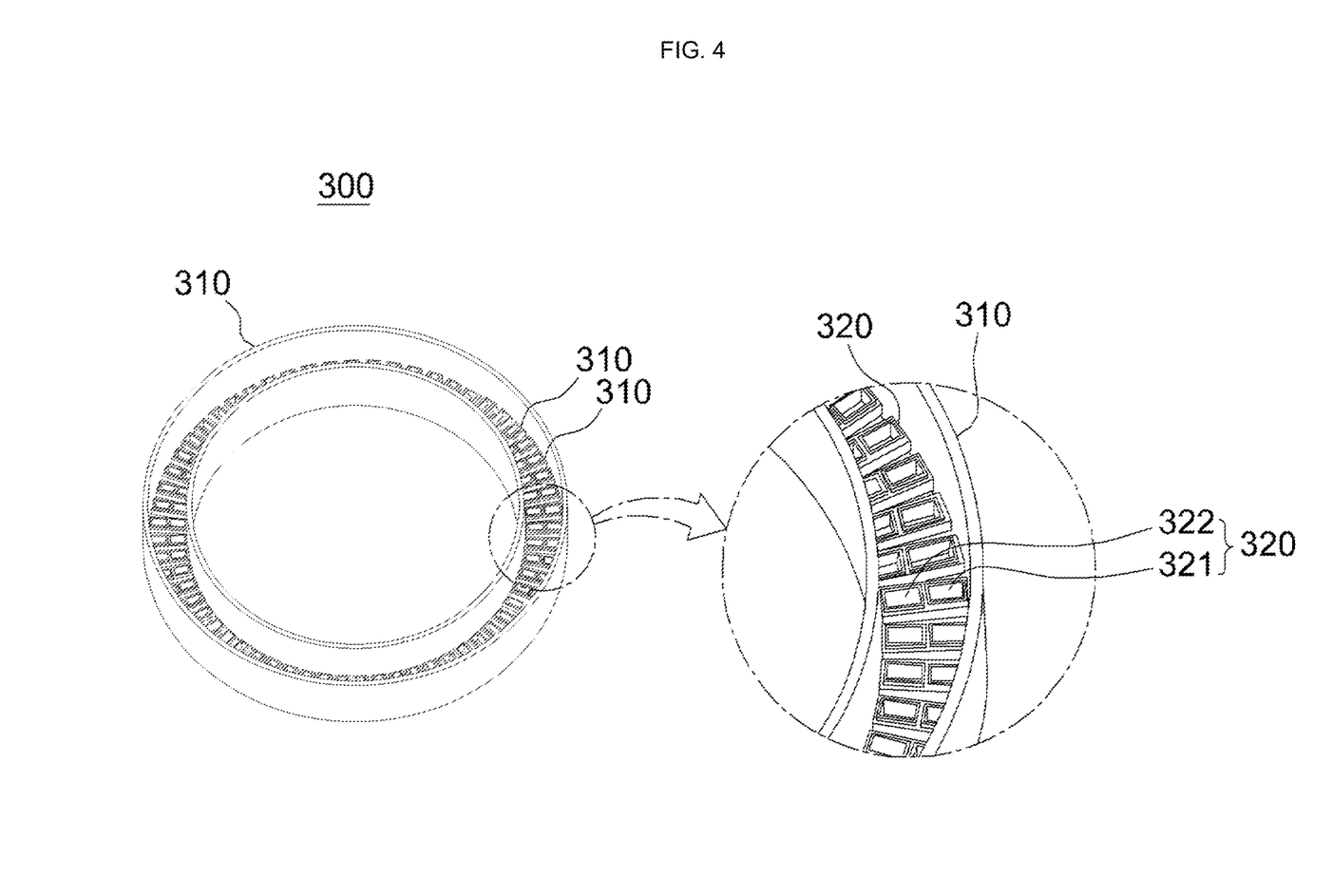
FIG. 4 is a perspective view illustrating a hairpin connecting device according to an exemplary embodiment of the present invention.

FIG. 4 is a perspective view illustrating the hairpin connecting device according to the exemplary embodiment of the present invention.

Referring to FIG. 4, a hairpin connecting device 300 according to the exemplary embodiment of the present invention may include a cover part 310 and a plurality of connection caps 320. The cover part 310 may be fastened to the leg side of the stator core 100, and may be generally formed in a circular loop or ring shape. The connection caps 320 may be provided inside the cover part 310, and a plurality of connection caps 320 may be arranged in a radial shape in a direction of a circumference of the cover part 310. Further, the cover part 310 may be formed of an insulator, and the connection cap 320 may be formed of an electrical conductor for electrically connecting the connected ends 213 of the respective hairpins 200.

Figure 5:
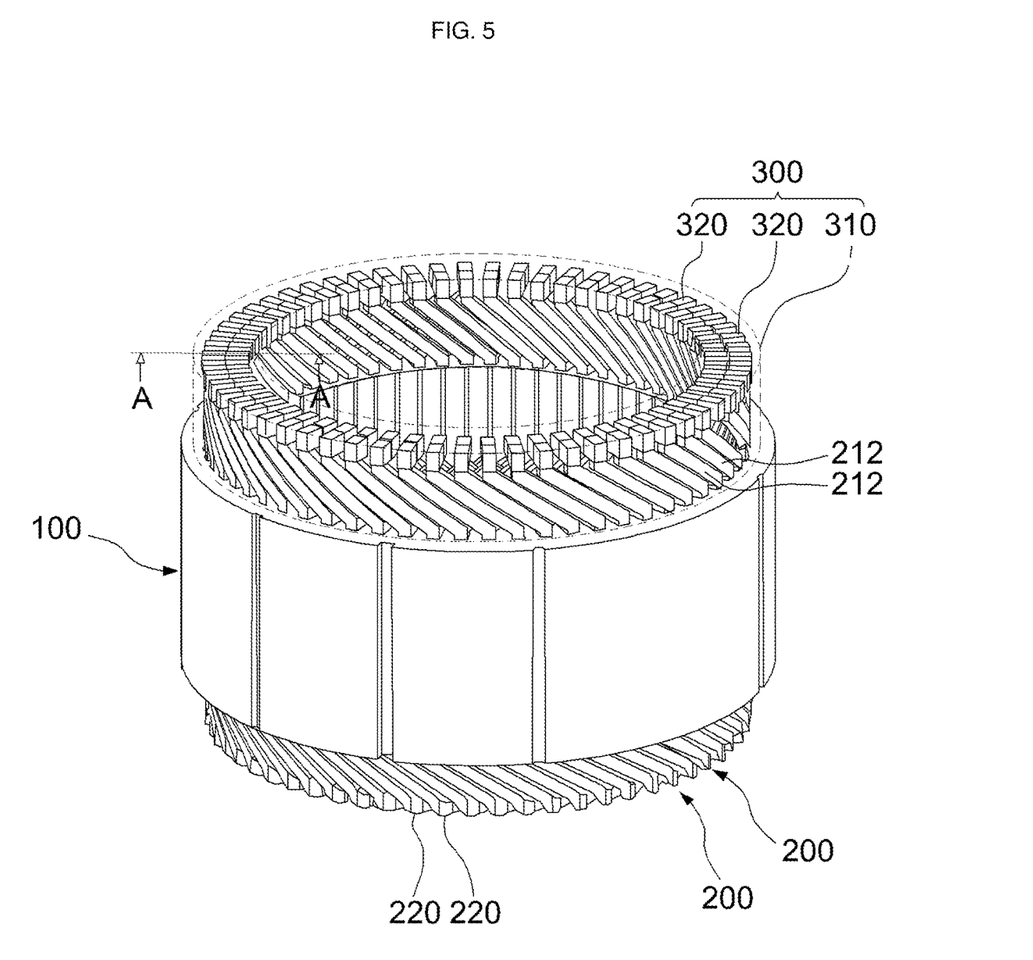
FIG. 5 is a perspective view illustrating a hairpin winding motor to which the hairpin connecting device illustrated in FIG. 4 is applied.
Figure 6:
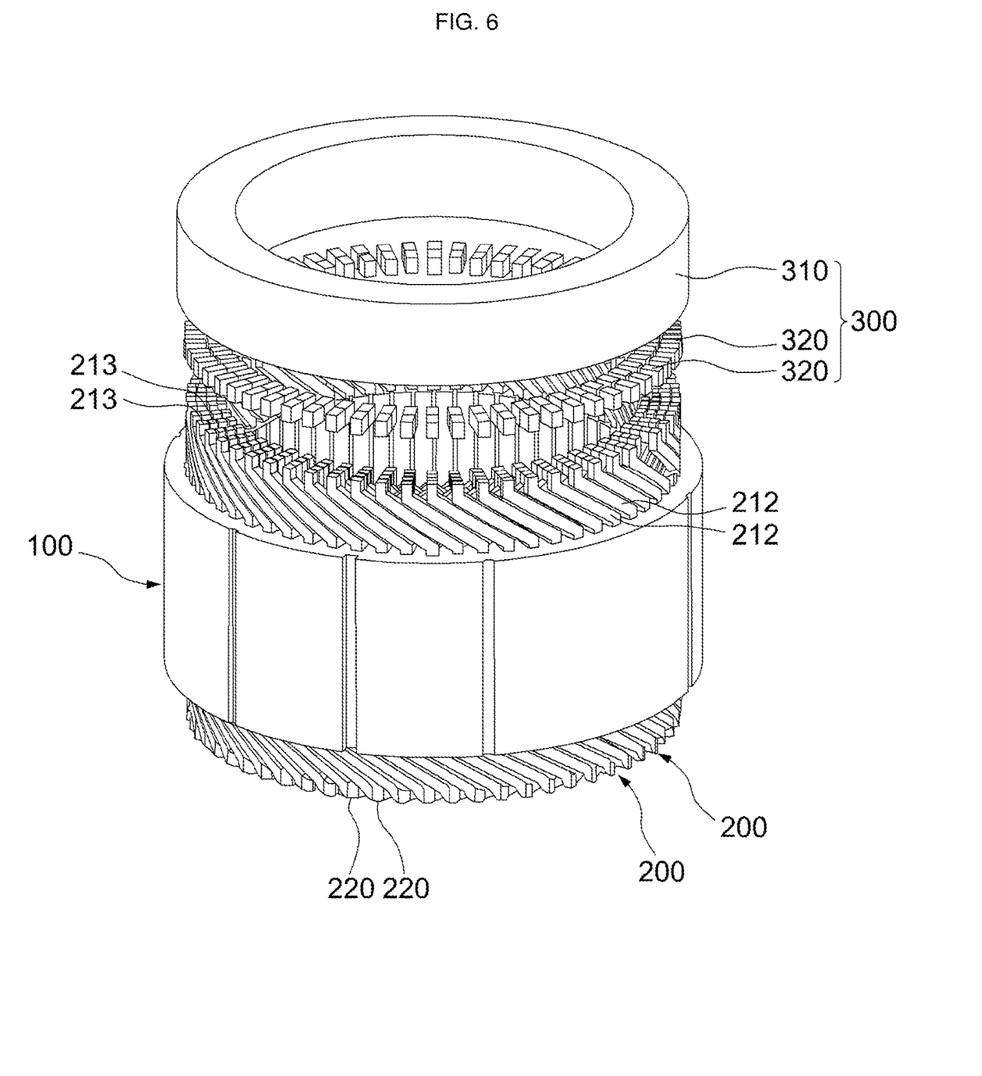
FIG. 6 is an exploded perspective view of the hairpin winding motor illustrated in FIG. 5.
Figure 7:
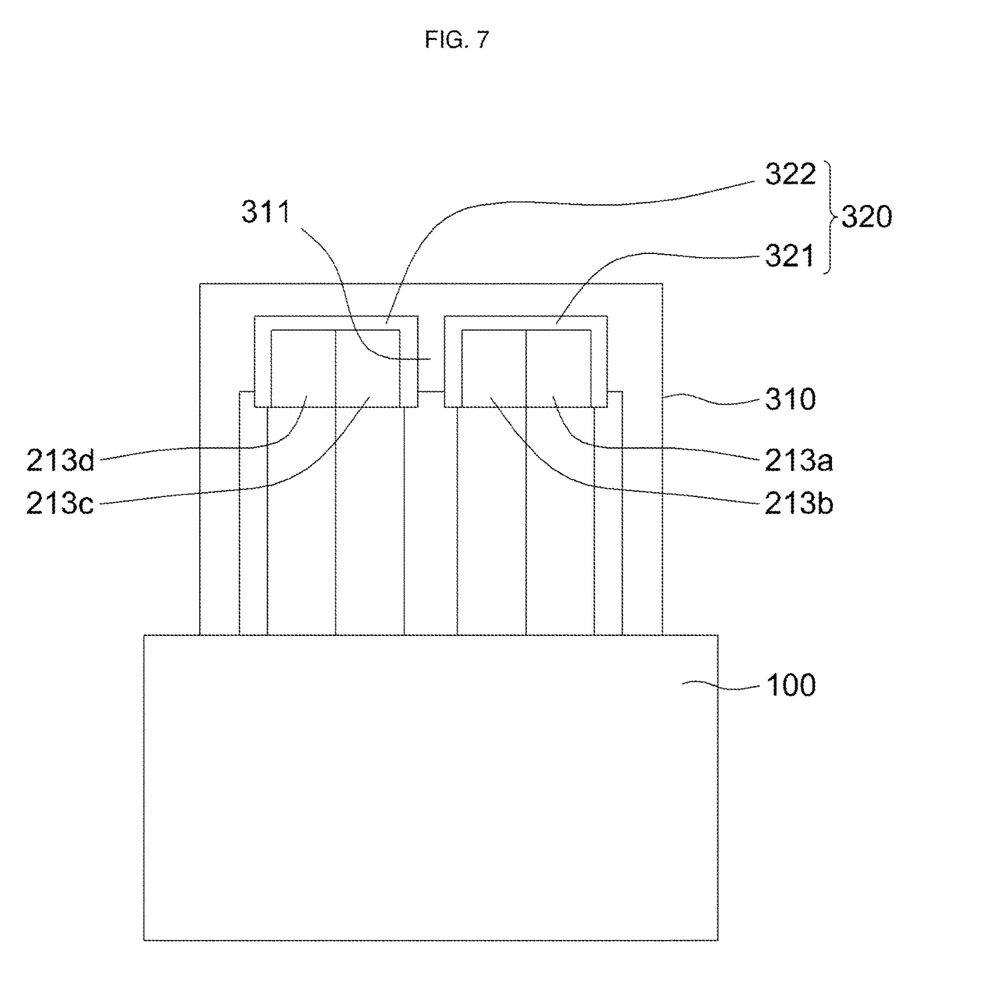
FIG. 7 is a view schematically illustrating a cross section taken along line A-A of FIG. 5.

FIG. 5 is a perspective view illustrating a hairpin winding motor in which the hairpin connecting device illustrated in FIG. 4 is mounted. FIG. 6 is an exploded perspective view of the hairpin winding motor illustrated in FIG. 5. FIG. 7 is a view schematically illustrating a cross section taken along line A-A of FIG. 5.

For convenience of description, in FIG. 5, the cover part 310 of the hairpin connecting device 300 is transparently illustrated.

Referring to FIGS. 5 and 6, the hairpin connecting device 300 may be fastened to the leg side of the stator core 100 to protect the leg portions 210 of the hairpins 200 exposed to the leg side, and may electrically connect the connected ends 213 of the respective leg portions 210.

More specifically, the circular loop or ring-shaped cover part 310 covers the connected ends 213 of the hairpins 200 arranged in the circular loop or ring shape at the leg side of the stator core 100. In this case, the cover part 310 may be formed so that the exposed portions 212 of the hairpins 200 exposed to the leg side or the connected ends 213 may be completely shielded from the outside. As a result, the exposed portions 212 or the connected ends 213 of the hairpins 200 may be protected from outside foreign materials or physical impact. Further, the cover part 310 is formed of an insulator, thereby serving to insulate the exposed portions 212 or the connected ends 213 of the hairpins 200 from the outside.

In the meantime, the connection cap 320 is fastened to one pair of adjacently arranged connected ends 213 to electrically connect both connected ends 213. The hairpin connecting device according to the present exemplary embodiment makes the connection cap 320 that is the electrical conductor be fastened to one pair of connected ends 213 even without connecting the respective connected ends 213 by welding, thereby electrically connecting the respective connected ends 213.

More specifically, the connection cap 320 may include a first connection cap 321 disposed inside of the cover part 310 in a radius direction and a second connection cap 322 disposed outside of the first connection cap 321 in a radius direction. The first connection cap 321 is fastened to the first connected end 213a disposed at an internal circumferential side of the stator core 100 and the second connected end 213b disposed at an external circumferential side of the first connected end 213a to electrically connect the first and second connected ends 213a and 213b. Further, the second connection cap 322 may electrically connect the third connected end 213c disposed at an external circumferential side of the second connected end 213b and the fourth connected end 213d disposed at an external circumferential side of the third connected end 213c. The first to fourth connected ends 213a, 213b, 213c, and 213d are described above with reference to FIG. 3.

In the hairpin connecting device 300 according to the present exemplary embodiment, the connection caps 320 including the first and second connection caps 321 and 322 are repeatedly arranged in the cover part 310 in a circular loop or ring shape, to be fastened to the connected ends 213 at respective corresponding positions. Accordingly, instead of repeating the multiple number of times of welding operations in order to connect the first and second connected ends 213a and 213b or the third and fourth connected ends 213c and 213d as in the related art, if the manufactured hairpin connecting device 300 covers the leg side of the stator core 100, the respective connected ends 213 are connected and operation efficiency or productivity may be greatly improved.

In the meantime, an insulation part 311 may be included between the first and second connection caps 321 and 322. The insulation part 311 may insulate the first and second connection caps 320 from each other. That is, the insulation part 311 may electrically insulate the first and second connected ends 213a and 213b fastened to the first connection cap 321 and the third and fourth connected ends 213c and 213d fastened to the second connection cap 322.

The insulation part 311 may be integrally formed with the cover part 310 as necessary, and may be formed as an insulation plate 311 extending from the cover part 310 to be disposed between the first and second connection caps 320, as illustrated in FIG. 7.

As described above, the hairpin connecting device and the hairpin winding motor including the same according to the exemplary embodiments of the present invention electrically connect the respective connected ends even without the connection through welding. Further, the plurality of connection caps is provided at the cover part to electrically connect the plurality of connected ends at a time, which replaces the multiple numbers of times of welding operation in the related art with one operation process, thereby considerably improve productivity and operation efficiency. Further, the hairpin connecting device and the hairpin winding motor including the same according to the exemplary embodiments of the present invention do not require a welding operation for connecting the connected ends, so that a problem, such as motor performance deterioration due to welding defect or failure or operation efficiency deterioration, may also be conveniently solved.

Although an exemplary embodiment of the present invention has been described, those skilled in the art will variously modify and change the present invention through supplement, change, deletion, addition of the constituent element, and the like, without departing from the spirit of the present invention defined in the claims, and the modification and the change will belong to the scope of the right of the present invention.

What is claimed is:

1. A hairpin connecting device, comprising:
   an insulation plate;
   a stator core comprising radial slots;
   hairpins arranged in the radial slots and forming an annular pattern;
   an annular cover comprising a circular groove; and
   caps disposed in the circular groove and completely covering adjacent pairs of tips of the hairpins,
   wherein the caps comprise inner caps disposed in an inner row, and in contact with an inner circumferential surface of the circular groove and the insulation plate, and outer caps disposed in an outer row, and in contact with an outer circumferential surface of the circular groove and the insulation plate,
   wherein the insulation plate is integrally formed with the cover, and
   wherein the each of the hairpins comprises a bend at which a first surface of the hairpin faces a second surface of the hairpin.

2. The hairpin connecting device of claim 1, wherein the cover is an electrical insulator, the hairpins are electrical conductors, and the caps are electrical conductors.

3. The hairpin connecting device of claim 1, wherein the cover shields the hairpins.

4. A hairpin winding motor comprising the hairpin connecting device of claim 1.

5. The hairpin connecting device of claim 1, wherein each of the hairpins comprises
   a first end portion extending in a first direction,
   a first exposed portion extending inwardly from the end portion,
   a first accommodated portion extending from the first exposed portion in the first direction, and
   a first head portion extending inwardly from the first accommodated portion.

6. The hairpin connecting device of claim 5, wherein the each of the hairpins further comprises
   a second end portion extending in the first direction,
   a second exposed portion extending inwardly towards the first exposed portion from the second end portion,
   a second accommodated portion extending from the second exposed portion in the first direction, and
   a second head portion extending inwardly to meet the first head portion.

7. The hairpin connecting device of claim 6, wherein
   the hairpins are integrally formed, and
   the bend is at a location where the first head portion meets the second head portion.

* * * * *